United States Patent [19]

Keiser

[11] Patent Number: 5,234,496

[45] Date of Patent: Aug. 10, 1993

[54] MICA BASED PIGMENTS COATED WITH ALKYLENE GLYCOL ALKYL ETHER

[75] Inventor: James R. Keiser, Lake Orion, Mich.

[73] Assignee: E. I. Du Pont de Nemours and Company, Wilmington, Del.

[21] Appl. No.: 738,219

[22] Filed: Jul. 30, 1991

[51] Int. Cl.$^5$ ............................................. C04B 14/20
[52] U.S. Cl. ..................................... 106/417; 106/311; 106/416; 106/DIG. 3
[58] Field of Search .................. 106/DIG. 3, 311, 416, 106/417

[56] References Cited

U.S. PATENT DOCUMENTS

| | | | |
|---|---|---|---|
| 3,087,828 | 4/1963 | Linton et al. | 106/291 |
| 3,711,308 | 1/1973 | Brand et al. | 106/291 |
| 4,005,051 | 1/1977 | Brunner | 106/311 |
| 4,146,403 | 3/1979 | Armanini et al. | 106/291 |
| 4,386,967 | 6/1983 | Ramaglia | 106/311 |
| 4,499,143 | 2/1985 | Panush et al. | 428/336 |
| 4,544,498 | 10/1985 | Suzuki et al. | 252/547 |
| 4,547,410 | 10/1985 | Panush et al. | 427/388.2 |
| 4,551,491 | 11/1985 | Panush et al. | 524/31 |
| 4,555,535 | 11/1985 | Bednarek et al. | 524/40 |
| 4,598,015 | 7/1986 | Panush et al. | 428/324 |
| 4,598,020 | 7/1986 | Panush et al. | 428/411.1 |
| 4,605,687 | 8/1986 | Panush et al. | 523/171 |

Primary Examiner—Mark L. Bell
Assistant Examiner—Scott L. Hertzog
Attorney, Agent, or Firm—Hilmar L. Fricke

[57] ABSTRACT

Finely divided mica based pigments coated with about 5-20% by weight, based on the weight of the pigment, of an alkylene glycol alkyl ether that can be added directly to a coating composition and blended with the coating composition and a process for coating the pigment with the alkylene glycol alkyl ether and blending the coated pigment into a coating composition.

10 Claims, No Drawings

MICA BASED PIGMENTS COATED WITH ALKYLENE GLYCOL ALKYL ETHER

BACKGROUND OF THE INVENTION

This invention is directed to mica based pigments that are coated with an alkylene glycol alkyl ether that can be readily incorporated into all types of coating compositions or paints such as alkyd resin paints, solvent based acrylic polymer paints, polyurethane paints and water based acrylic polymer or polyurethane paints.

Mica based pigments are known in the art and have been used in coating compositions to provide unique finishes having a pearlescent appearance. Mica based pigments wherein mica flakes are coated with titanium dioxide pigment and to provide color are coated with mixtures of titanium dioxide pigment and metallic oxide pigments such as iron oxide are shown in Linton U.S. Pat. No. 3,087,828 issued Apr. 30, 1963, Brand et al U.S. Pat. 3,711,308 issued Jan. 16, 1973 and in Armanini et al U.S. Pat. No. 4,146,403 issued Mar. 27, 1979.

Incorporation of these mica based pigments into coating compositions can be accomplished by the usual method by first forming a dispersion or mill base of the pigment and then blending the dispersion with the coating composition. A typical dispersion contains the mica based pigment, a liquid carrier which may be solvent or water and a polymeric dispersant. The dispersion is blended or mixed with the coating composition to obtain a desired color for the coating composition. These dispersions have obvious disadvantages of being liquids that must be compatible with the coating composition and therefor, a number of dispersions must be utilized for different types of coating compositions such as waterborne compositions, solvent based compositions, compositions having different film forming binders such as acrylic polymers, alkyd resins, epoxy resins, epoxy ester resins, polyurethanes, polyesters and the like. It would be desirable to be able to mix or blend the mica based pigment directly into the coating composition and eliminate forming a dispersion of the pigment. This cannot be done with untreated pigment since it will not readily blend into the coating composition and will either float on its surface or agglomerate or both.

The novel treated mica based pigment of this invention can be blended into all types of coating compositions including waterborne or solvent based compositions that are formed with a variety of film forming polymers.

SUMMARY OF THE INVENTION

Finely divided mica based pigments coated with about 5-20% by weight, based on the weight of the pigment, of an alkylene glycol alkyl ether can be added directly to a coating composition and blended with the coating composition. A process for coating the pigment with the alkylene glycol alkyl ether and blending the coated pigment into a coating composition also is part of this invention.

DETAILED DESCRIPTION OF THE INVENTION

The coated mica based pigments can readily be blended into a wide variety of coating compositions to create the desired color or adjust the color of the composition. Typical coating compositions to which the coated mica based pigments can be added are solvent based compositions or waterborne compositions which may be in solution or dispersion and may be cured at ambient temperatures or under elevated temperatures where, for example, the film forming polymer is an acrylic polymer, epoxy resin, epoxy ester resin, polyester, polyester urethane, polyether urethane, alkyd resin, and may contain crosslinking agents such as alkylated melamines, benzoguanamines, polyisocyanates, blocked polyisocyanates and the like.

The mica based pigments are mica flakes coated with a thin translucent layer of titanium dioxide pigment or zirconium oxide pigment and to provide color may have a layer of a metallic oxide pigment such as iron oxide. Oxides of other metals such as copper, calcium, cobalt, barium, strontium, manganes, magnesium, tin, lithium and the like also can be used.

The preparation of these mica based pigments is taught in the afroementioned U.S. Pat. Nos. 3,087,828, 3,711,308 and 4,146,403 which are hereby incorporated by reference. Mica based pigments are sold commercially by The Mearl Corporation, Merck GmbH and EM Chemicals.

Of particular interest are iron oxide encapsulated mica pigments which are encapsulated with a layer of titanium dioxide pigment and iron oxide pigment. These pigments are optically pearlescent since the transparency of the pigment permits light to pass through the pigment particles resulting in a multiplicity of refraction and reflections. In addition, these pigments have hiding capabilities, are additive colors and retain a metallic appearance. These features provide the capability of producing colors with depth, clarity and chromaticity that is not attainable with conventional metal flake pigments such as aluminum flake.

Typically useful mica based pigments are Afflair® 9504 Red Pearl pigment, Afflair® 9500 Bronze Pearl, Afflair® 9225 Blue Pearl, Afflair® 9103 White Pearl, Afflair® 9219 Lilac Pearl, Exterior Mearlin Super Green 8392, Afflair® 9205 Gold Pearl and the like.

The coated mica based pigments are prepared by simply mixing the pigment with about 5-20% by weight, based on the weight of the pigment, of alkylene glycol alkyl ether. Sufficient mixing is done to completely wet the pigment. To retain the free flowing characteristics of the pigment only enough of the glycol is used to wet the pigment but not to allow the pigment to agglomerate. The coated pigment can be packaged in any container which will not allow evaporation of the glycol.

Typical alkylene glycol alkyl ethers are for example ethylene glycol mono butyl ether, diethylene glycol n-butylether, propylene glycol n-butyl ether and the like. Ethylene glycol mono butyl ether is particularly preferred since it provides all of the needed properties to the pigments to make them compatible with all types of coating compositions.

The coated mica based pigments are particularly useful in refinish paints. The coated pigments can be added directly to the paint in a refinish shop or refinish paint supplier to obtain an exact color match to the automobile or truck that is being refinished.

Typically these mica based pigments are used in basecoat compositions over which a clear coating composition is applied. These basecoat composition can be applied over suitably primed and/or sealed plastic or metal substrates by conventional techniques such as spraying, electrostatic spraying, dipping, brushing, flowcoating and the like. The preferred method is spraying. The basecoat is applied to a dry film thickness of about 0.1–3.0 mils. The basecoat usually is dried but not fully cured, and cured either at ambient temperatures for about 5–30 minutes or at elevated temperatures for shorter periods of time. A clear coating is then applied by one of the aforementioned methods, usually spraying or electrostatic spraying is the application method used. About 1–5 mils (dry film thickness) of the clear layer is applied. The clear coat/basecoat is then cured at ambient temperatures.

The following example illustrates the invention. All parts and percentages are on a weight basis unless otherwise indicated.

EXAMPLE 1

A wetted pearl mica pigment was prepared by mixing 90 parts by weight of Afflair ® Red Pearl Pigment sold by EM Industries with about 10 parts by weight of ethylene glycol mono butyl ether for about 5 minutes. The resulting product is a dry free flowing pigment that is coated with the ethylene glycol mono butyl ether.

EXAMPLE 2

A red basecoat was prepared by charging 4.2 parts by weight of the wetted pearl mica pigment prepared in Example 1 into a container with 32 parts by weight of a mixture of four colors of acrylic lacquer tints (13.8 parts trans red oxide tint, 10.4 parts red violet tint, 5.9 parts maroon tint and 1.9 parts black tint) and 63.6 parts by weight of an acrylic lacquer balancing clear composition. The container was closed and placed on a paint shaker for 5 minutes to blend the above constituents together to form a basecoat. The resulting basecoat was reduced to a spray viscosity with a conventional lacquer solvent. This resulting basecoat was sprayed onto primed aluminum panels. Three coats were applied allowing 30 second between coats to provide a total dry film thickness of about 1.2–1.6 mils. After 30 seconds at ambient temperature two coats of a clear polyurethane coating were applied to a dry film thickness of about 1.5–1.8 mils. After ten minutes at ambient temperature, the panels were baked at about 49° C. for about 20 minutes. The resulting finish on the panels had an excellent appearance.

The same basecoat was prepared as above except that the pearl mica based pigment was added to the basecoat in the form of a conventional mill base instead of the wetted pigment prepared in Example 1. The resulting basecoat was spray applied as above to primed aluminum panels and top coated with the same clear coat and dried and baked under the same conditions. The resulting finish had the same appearance as that prepared above.

EXAMPLE 3

A red basecoat was prepared by charging 6.3 parts by weight of the wetted pearl mica pigment prepared in Example 1 into a container with 23.5 parts by weight of a mixture of three colors of polyurethane tints and 70.2 parts by weight of a polyurethane balancing clear composition. The container was closed and placed on a paint shaker for 5 minutes and the constituents were blended together. About 1 part by weight of polyisocyanate solution was added to 3 parts by weight of the composition prepared above to form a basecoat. The resulting basecoat was sprayed onto primed aluminum panels. Three coats were applied allowing 30 second between coats to provide a total dry film thickness of about 1.5–1.8 mils. After 10 minutes at ambient temperature two coats of a clear polyurethane coating were applied to a dry film thickness of about 1.2–1.5 mils. After ten minutes at ambient temperature, the panels were baked at about 49° C. for about 20 minutes. The resulting finish on the panels had an excellent appearance.

The same basecoat was prepared as above except that the pearl mica based pigment was added to the basecoat in the form of a conventional mill base instead of the wetted pigment prepared in Example 1. The resulting basecoat was spray applied as above to primed aluminum panels and topcoated with the same clear coat and dried and baked under the same conditions. The resulting finish had the same appearance as that prepared above.

EXAMPLE 4

A red basecoat was prepared by charging 3.7 parts by weight of the wetted pearl mica pigment prepared in Example 1 into a container with 37 parts by weight of a mixture of four colors of Cronar ® tints and 59.3 parts by weight of a Cronar ® balancing clear. The container was closed and placed on a paint shaker for 5 minutes to blend the above constituents together. About 100 parts by weight of an enamel organic solvent were added to reduce the composition to a spray viscosity. The resulting basecoat was sprayed onto primed aluminum panels. Four coats were applied allowing 2–3 minutes between coats to provide a total dry film build of about 0.8–1.2 mils. After 10 minutes at ambient temperature two coats of a clear polyurethane coating were applied to a dry film thickness of about 1.5–1.8 mils. After ten minutes at ambient temperature, the panels were baked at about 49° C. for about 20 minutes. The resulting finish on the panels had an excellent appearance.

The same basecoat was prepared as above except that the pearl mica based pigment was added to the basecoat in the form of a conventional mill base instead of the wetted pigment prepared in Example 1. The resulting basecoat was spray applied as above to primed aluminum panels and topcoated with the same clear coat and dried and baked under the same conditions. The resulting finish had the same appearance as that prepared above.

EXAMPLE 5

A red basecoat was prepared by charging 6.5 parts by weight of the wetted pearl mica pigment prepared in Example 1 into a container with 93.5 parts by weight of a mixture of four colors of acrylic balanced enamel tints. The container was closed and placed on a paint shaker for 5 minutes to blend the above constituents together. About 50 parts by weight of a enamel organic solvent were added to reduce the composition to a spray viscosity. The resulting basecoat was sprayed onto primed aluminum panels. Three coats were applied allowing 2–3 minutes between coats to provide a total dry film build of about 1.2–1.5 mils. After 10 minutes at ambient temperature two coats of a clear polyurethane coating were applied to a dry film thickness of about 1.5–1.8 mils. After ten minutes at ambient temperature, the panels were baked at about 49° C. for about 20 minutes. The resulting finish on the panels had an excellent appearance.

The same basecoat was prepared as above except that the pearl mica based pigment was added to the basecoat in the form of a conventional mill base instead of the wetted pigment prepared in Example 1. The resulting basecoat was spray applied as above to primed aluminum panels and topcoated with the same clear coat and dried and baked under the same conditions. The resulting finish had the same appearance as that prepared above.

What is claimed is:

1. Dry flowable finely divided mica based pigments comprising mica flake coated with a thin translucent layer of titanium dioxide or zirconium oxide pigment where the pigments are coated with about 5-20% by weight, based on the weight of the pigment, of an alkylene glycolalkyl ether.

2. The mica pigments of claim 1 in which the pigments comprise mica flake coated with titanium dioxide pigment.

3. The mica pigments of claim 1 in which the pigments comprise mica flake coated with titanium dioxide pigment and other metallic oxide pigments.

4. The mica pigments of claim 1 in which the pigments comprise mica flake coated with ethylene glycol monobutyl ether.

5. The mica pigments of claims 2 or 3 which are coated with ethylene glycol mono butyl ether.

6. A process wherein dry flowable finely divided mica based pigments comprising mica flake coated with a thin translucent layer of titanium dioxide or zirconium oxide pigment where the pigments are coated with about 5-20% by weight, based on the weight of the pigment, of an alkylene glycol alkyl ether are added directly to a coating composition and blended with the coating composition.

7. The process of claim 6 in which the alkylene glycol alkyl ether is ethylene glycol mono butyl ether.

8. The process of claim 6 in which the coating composition is a waterbased or solvent based composition.

9. The process for forming the coated mica based pigments of claim 1 which comprises mixing about 5-20% by weight, based on the weight of the pigment of alkylene glycol alkyl ether with mica based pigment to form a dry flowable coated mica based pigments.

10. The process of claim 9 in which the alkylene glycol alkyl ether is ethylene glycol mono butyl ether.

* * * * *